Sept. 24, 1946.    H. A. STRICKLAND, JR    2,408,350
ELECTRIC FURNACE MACHINE
Filed March 21, 1941    9 Sheets-Sheet 1
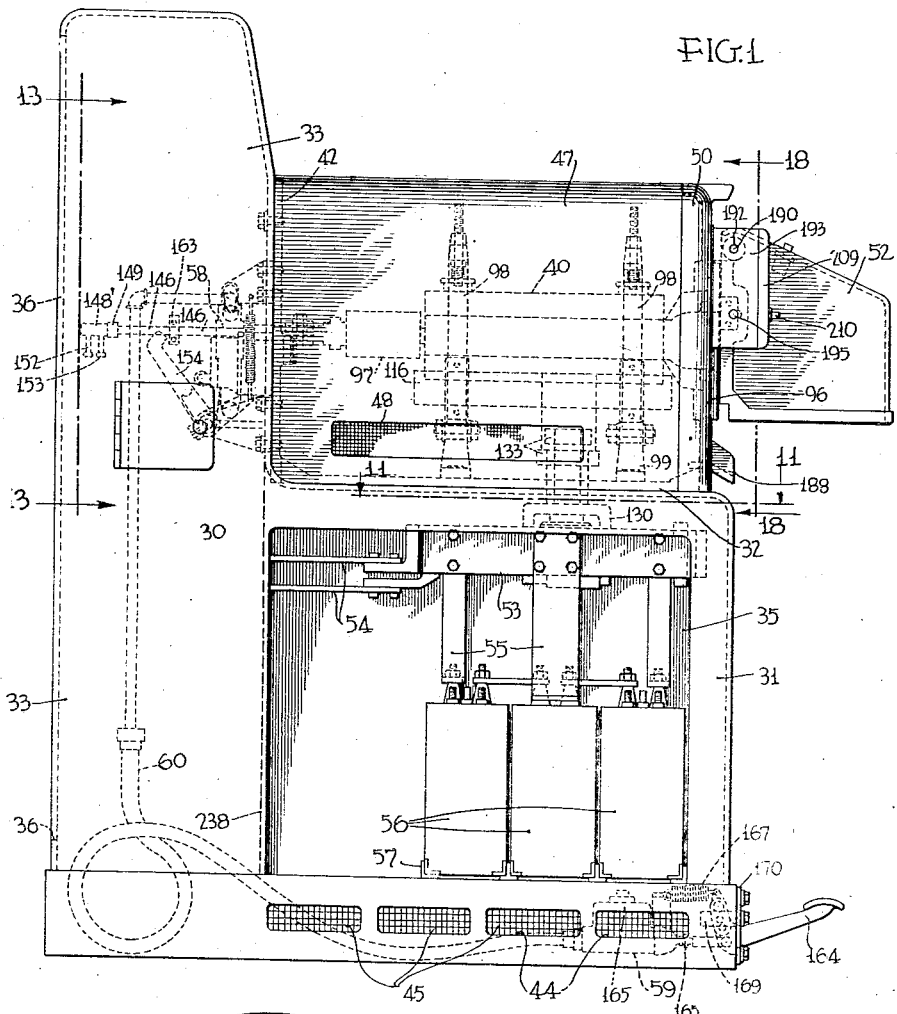
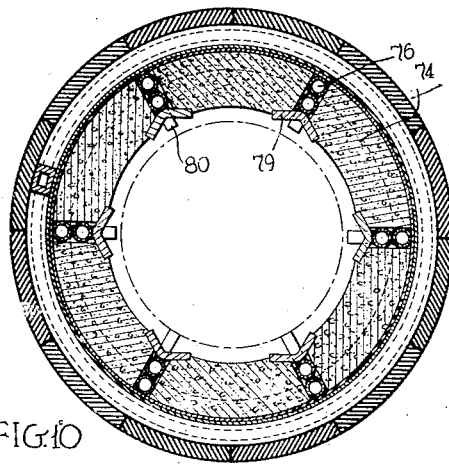
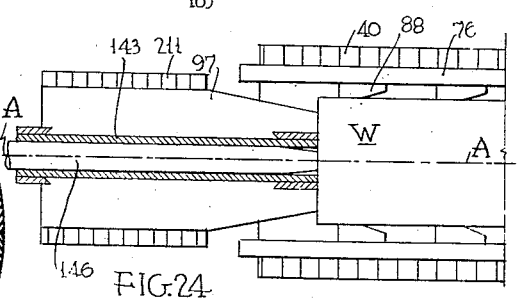
INVENTOR
Harold A. Strickland Jr.
BY
ATTORNEY Sept. 24, 1946. H. A. STRICKLAND, JR 2,408,350
ELECTRIC FURNACE MACHINE
Filed March 21, 1941 9 Sheets-Sheet 2

INVENTOR
Harold A. Strickland Jr.
BY
ATTORNEY

Sept. 24, 1946.　　H. A. STRICKLAND, JR　　2,408,350
ELECTRIC FURNACE MACHINE
Filed March 21, 1941　　9 Sheets-Sheet 3

INVENTOR
Harold A. Strickland Jr.
BY
ATTORNEY

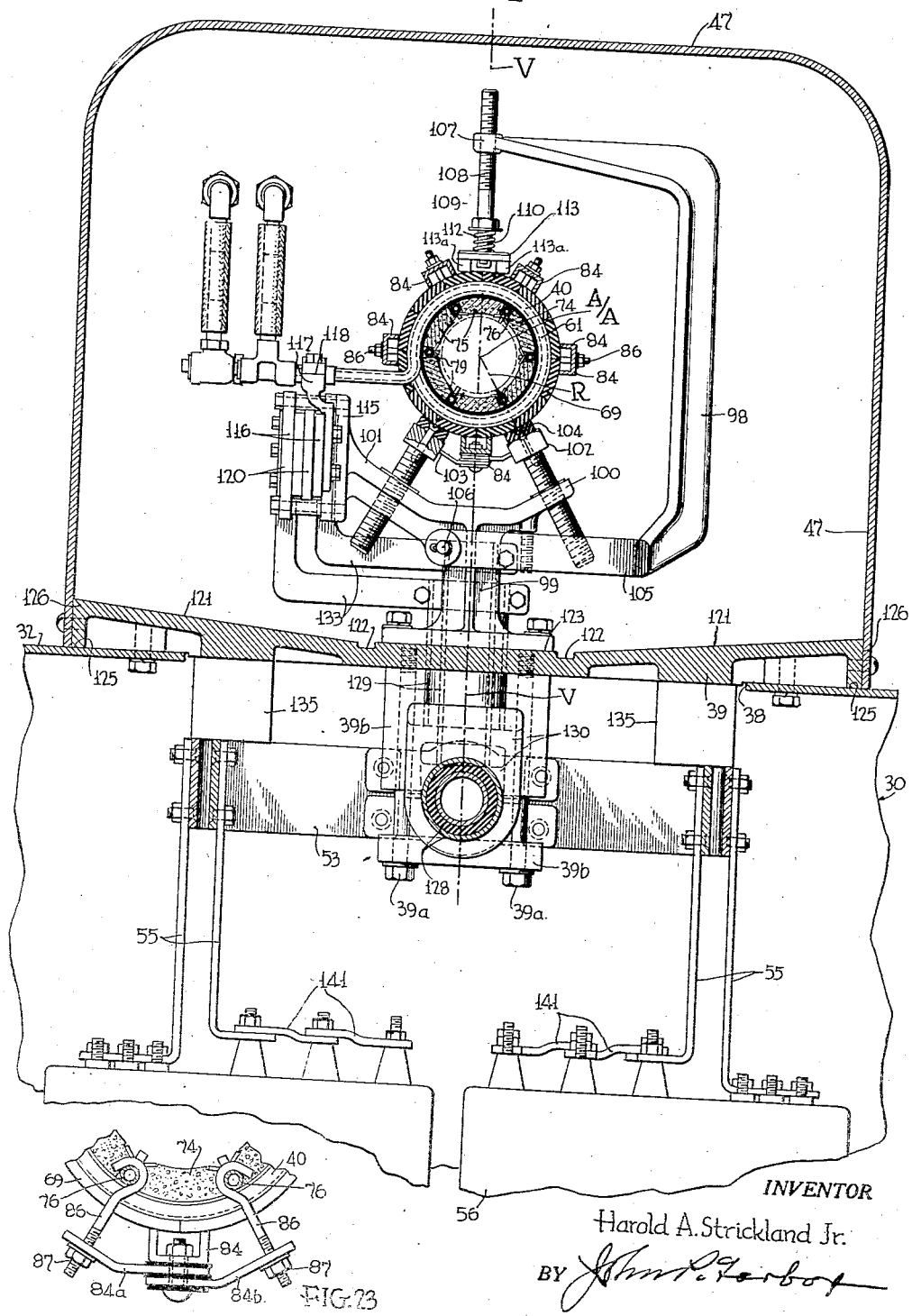
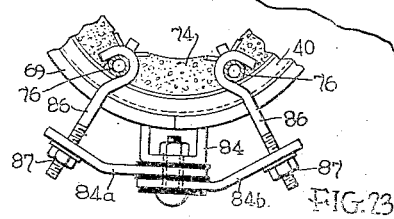

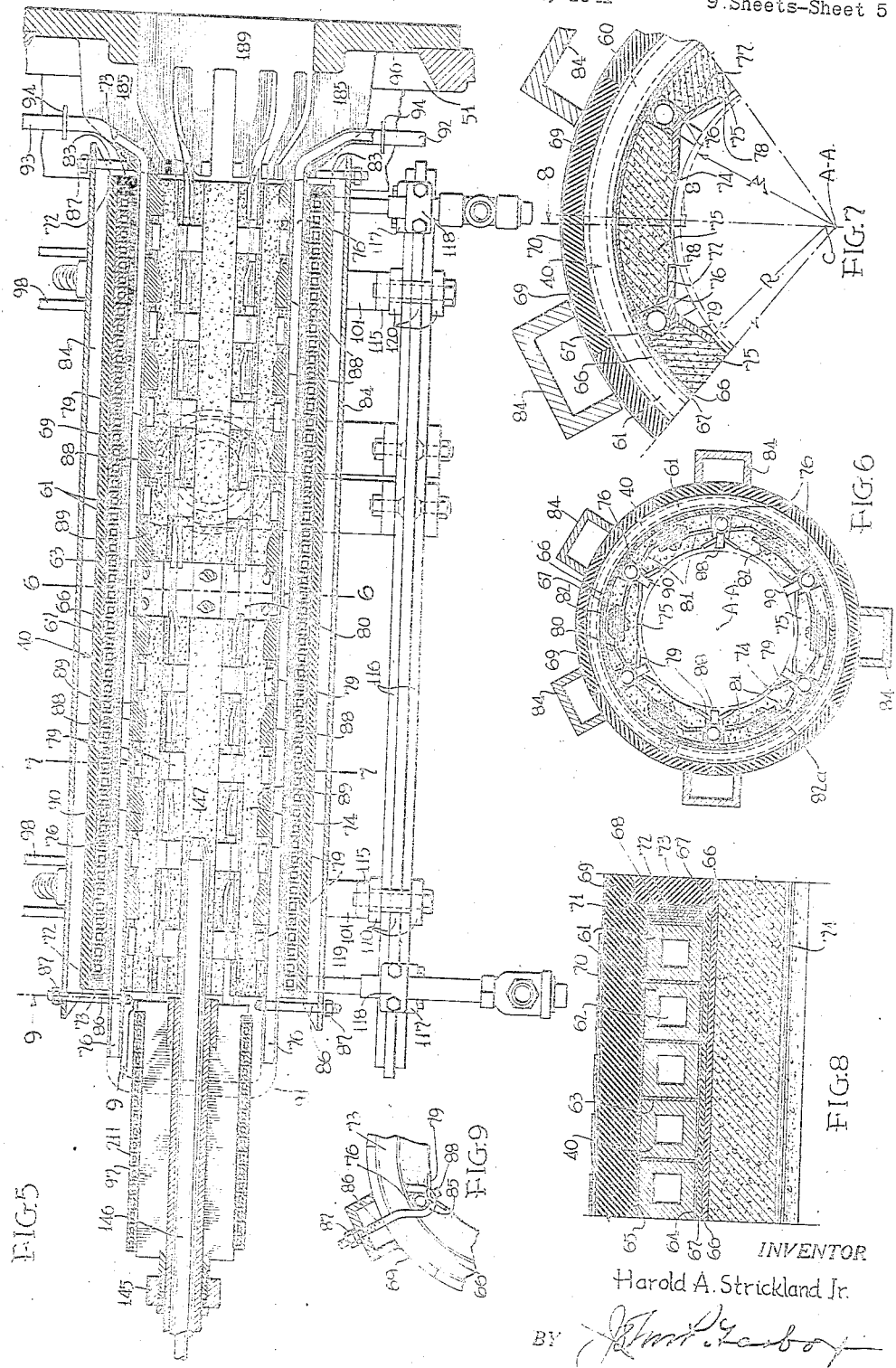

Sept. 24, 1946.  H. A. STRICKLAND, JR  2,408,350
ELECTRIC FURNACE MACHINE
Filed March 21, 1941  9 Sheets-Sheet 6
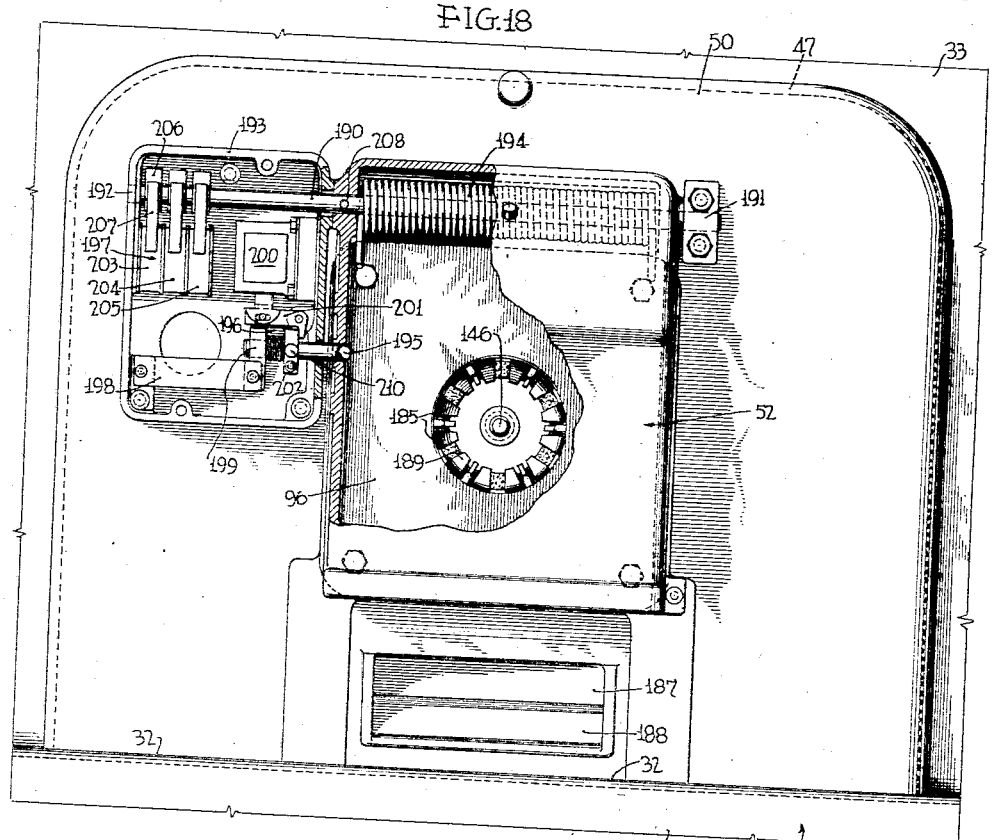
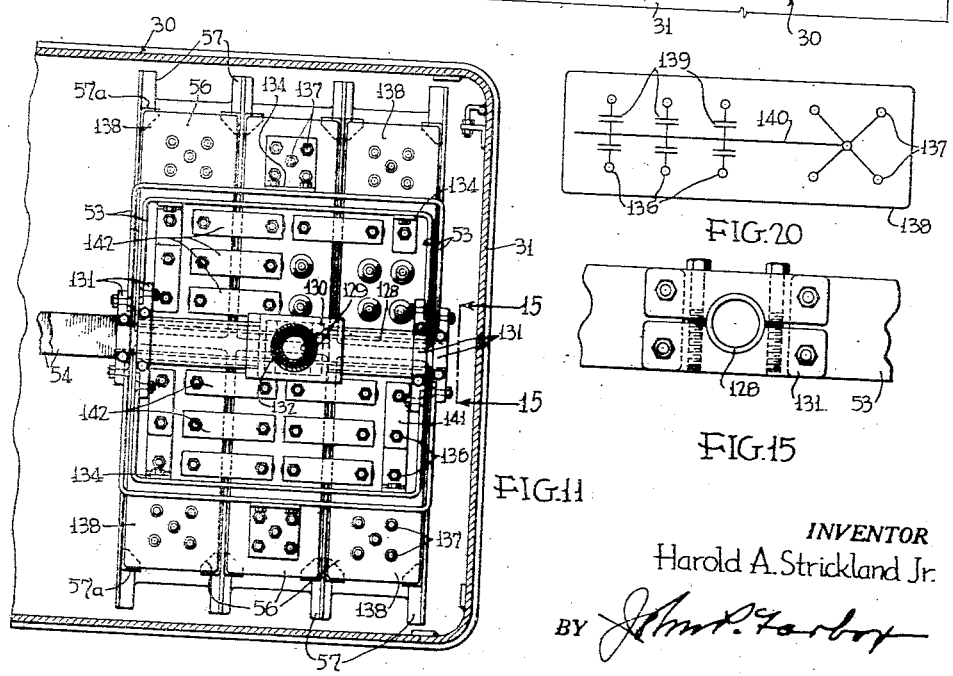
INVENTOR
Harold A. Strickland Jr.
BY
ATTORNEY Sept. 24, 1946.    H. A. STRICKLAND, JR    2,408,350
ELECTRIC FURNACE MACHINE
Filed March 21, 1941    9 Sheets-Sheet 7
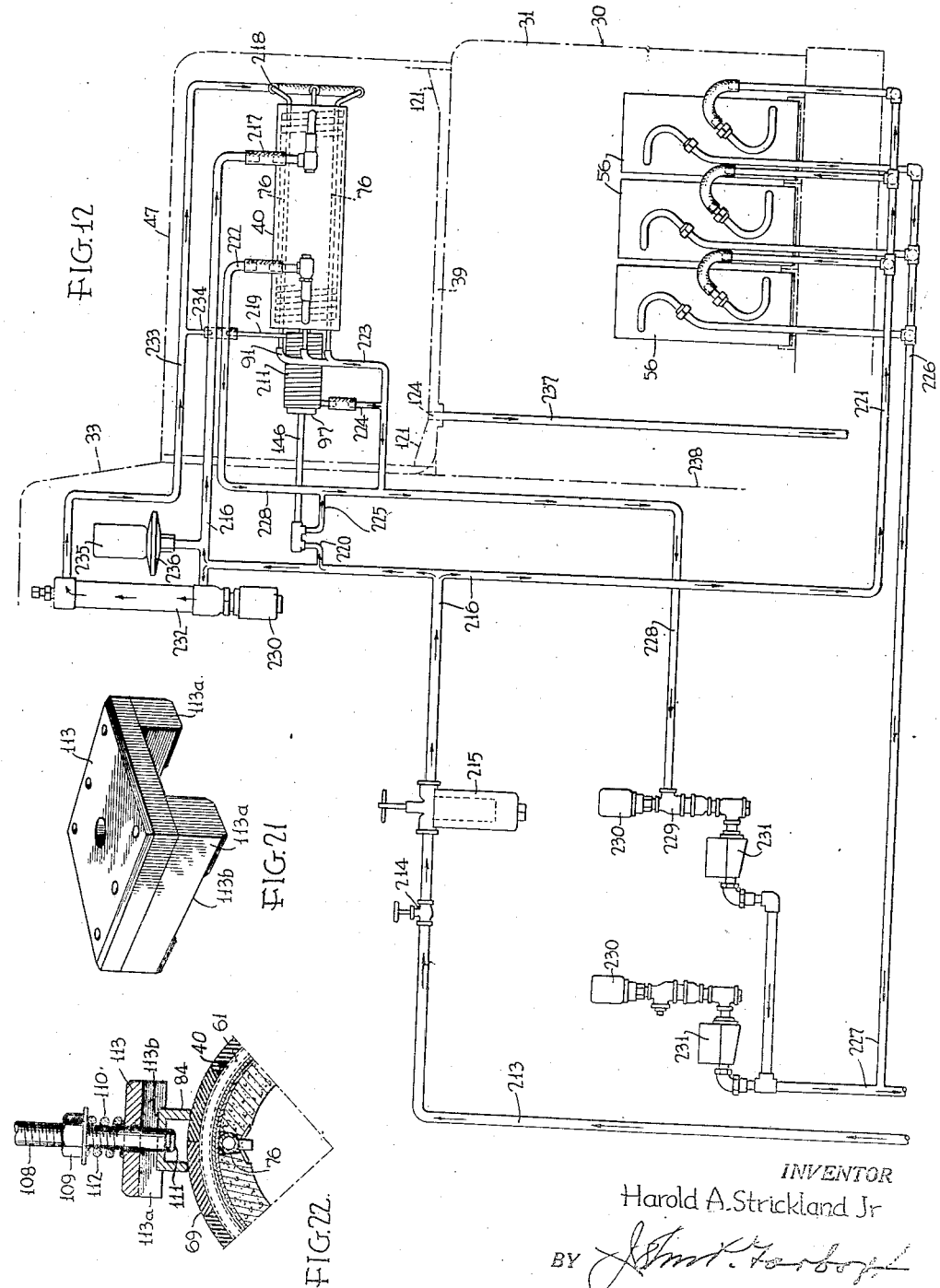
INVENTOR
Harold A. Strickland Jr
BY
ATTORNEY Sept. 24, 1946.  H. A. STRICKLAND, JR  2,408,350
ELECTRIC FURNACE MACHINE
Filed March 21, 1941  9 Sheets-Sheet 8
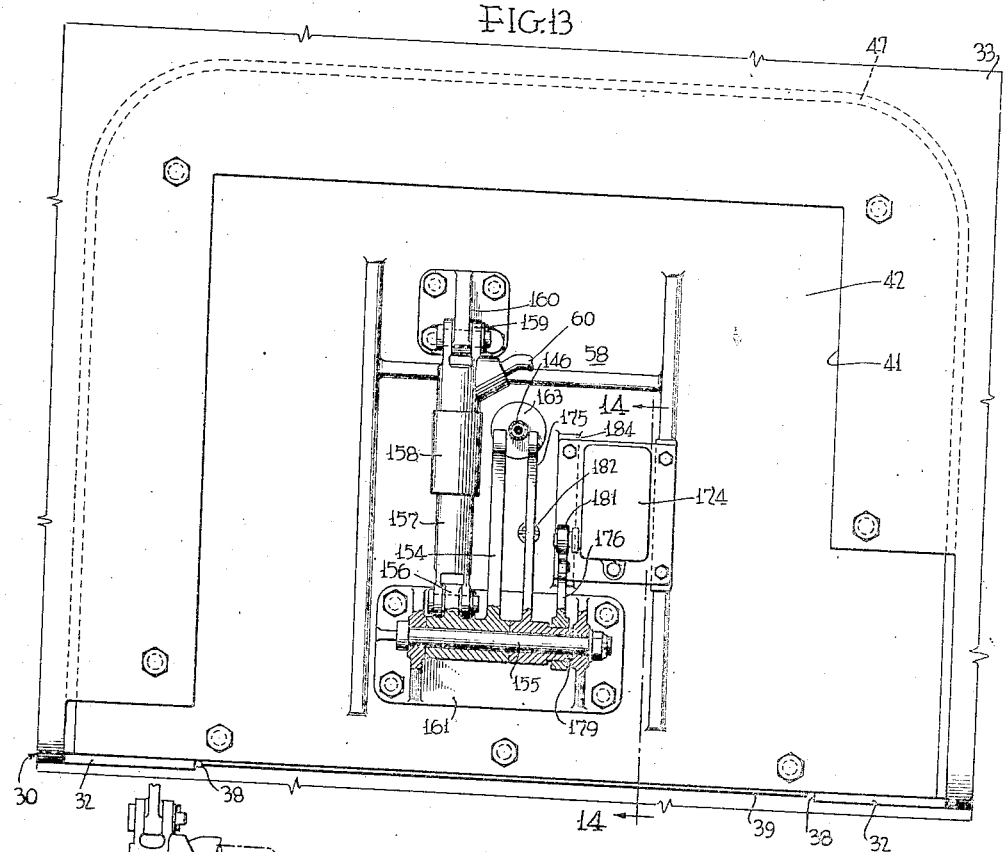
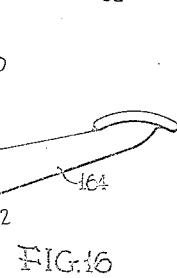
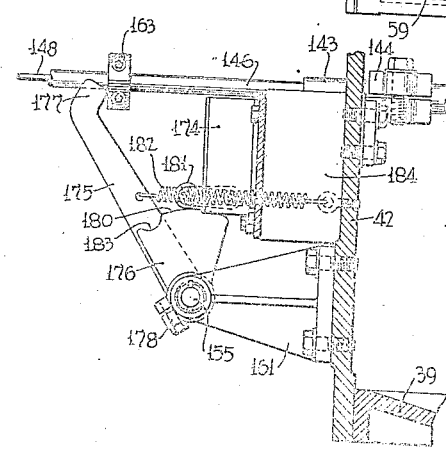
INVENTOR
Harold A. Strickland Jr.
BY
ATTORNEY Sept. 24, 1946.     H. A. STRICKLAND, JR     2,408,350
ELECTRIC FURNACE MACHINE
Filed March 21, 1941     9 Sheets-Sheet 9

INVENTOR
Harold A. Strickland Jr.
BY
ATTORNEY

Patented Sept. 24, 1946

2,408,350

UNITED STATES PATENT OFFICE 2,408,350

ELECTRIC FURNACE MACHINE

Harold A. Strickland, Jr., Detroit, Mich., assignor, by mesne assignments, to The Budd Company, Philadelphia, Pa., a corporation of Pennsylvania Application March 21, 1941, Serial No. 384,503

8 Claims. (Cl. 219—13)

My invention relates to furnaces for heating by electromagnetic induction, and particularly to those which can be used or are intended for use in the heating of bar or billet stock for forging purposes. In such furnaces, bar or billet stock of either solid or tubular form, and either circular or angular in cross-section, is inserted within a coil adapted to be supplied with power from an alternating current source, usually a high-frequency alternating current source of considerable voltage, and the power being turned on to the coil, heating currents are set up within the mass of the bar or billet to be heated due to the electromagnetic induction from the coil itself. These currents heat the bar or billet to a forging temperature. Such a bar or billet is commonly called a workpiece. The objects of my invention follow.

Outstandingly I aim to make such a furnace a machine. This I achieve through the construction, organization, and automation of its various component parts, e. g., the heating coil into which the workpiece is thrust for its heating, and all appurtenant devices. I have aimed to achieve in this machine a quantity production apparatus outstandingly adapted for installation in connection with high-speed production systems and lines common in today's industry.

Reliability, uniformity of heating, consistency, and continuousness of operation have been important ends which I have had in view. Construction and arrangement of parts, and automation have also played an important part in the attainment of these ends. Automation and coordination of automation in interlocking of control elements have enabled me to attain these ends to an extent practically eliminating the personal equation of the operator, and likewise eliminating disturbances of these several factors, reliability, consistency, and continuousness, occasioned by disorders of any kind emanating from whatever source reaching the machine.

It has been an object too to provide a system of indicators and signals which not only portray in a simple and unmistakable manner all of the conditions under which the machine is operating or not operating, as the case may be, which may be necessary for its intelligent use to the above ends, and moreover such a system of indicators and signals which themselves demand any necessary attention of the operator.

I have sought safety in the use of such a machine through appropriate housings of all of its high-frequency high-voltage parts, not to mention effective insulation of them from the housings, and the coordination of the closures of such housings with the automation and the indicating and signalling systems, particularly in the latter case in such manner that the high-frequency high-voltage power cannot be applied to the machine, save that the housings closures are complete.

It has been an aim to render the furnace most easily manipulable. The mere act of loading through closure of its loading door initiates the automatic cycle. Reloading is required in the event of a completed cycle.

Handling of the workpieces into and out of the furnace is provided for by constructions and mechanisms in a manner which affords ease, safety, and certainty to the operator, safeguards the heating coil and its workpiece supports from damage by heavy stock, and assures delivery of the workpiece in best condition with greatest promptness under uniformly obtaining temperatures.

The attainment of constructions through which one and the same machine may be used to heat workpiece stock of a wide range of dimensions has also been an important aim. This I believe I have done with a very maximum degree of simplicity and resultant facility of change.

I have endeavored also to arrange the various assemblies and subassemblies of the machine so that they may be removed and replaced in efficiently handled groups of parts to the ends of simplifying and facilitating repair and replacement, testing, exchanging between one machine and another, and of course efficiency of initial manufacture.

Other objects and full amplifications of the foregoing outstanding objects will be fully apparent upon one's acquiring that understanding of the invention which is afforded by the accompanying drawings and the following detailed description thereof.

There is delineated in the drawings that embodiment of my invention now best known to me, but it will be quite apparent that it is subject to yet other embodiments.

Of the drawings:

Figure 1 is a side elevation of the machine of my invention with the principal parts enclosed by the housings of the machine. The heating coil is shown in dotted line in the upper portion of the housing, while the door normally closing the lower part of the housing, has been removed to show a bank of condensers connected with the coil;

Figure 4 is a transverse section, transaxial to the heating coil, taken on line 4—4 of Figure 3 looking in the direction of the arrows;

Figure 5 is an enlarged horizontal cross-section of the heating coil in a plane including the axis of the coil;

Figure 6 is a transaxial section of the heating coil on line 6—6 of Figure 5;

Figure 7 is an enlargement of a portion of such a transaxial cross-section of the coil taken on a line such as 7—7 of Figure 5;

Figure 8 is a correspondingly enlarged portion of a longitudinal section, being a view taken on line 8—8 of Figure 7 looking in the direction of the applied arrows;

Figure 9 is a rear end elevation of a detail of the heating coil showing the detail of the mounting of the work-supporting rails which lie within the coil;

Figure 10 is a transaxial cross-section similar to that of Figure 6 applying to a modified form of coil and accompanying workpiece supports within the coil.

Figure 11 is a partial horizontal section on line 11—11 of Figure 1 looking in the direction of the arrows to show the banks of condensers mounted in the base of the machines and the bus bars through which they are connected with the source of power and with the heating coil.

Figure 12 is a diagram of the water-cooling conduits and circuits and their included devices connected with the automation system, as applied to the various instrumentalities of the machine, e. g., work coil, condensers, etc.

Figure 13 is a rear elevation of the mechanism having to do with workpiece gauging and locating, workpiece push-out, and magnetic core mounting, the view being taken substantially on line 13—13 of Figure 1 looking in the direction of the applied arrows.

Figure 14 is a side elevation of the mechanism of Figure 13 taken approximately on line 14—14 of Figure 13 looking in the direction of the arrows.

Figure 15 (see the sheet containing Figures 11 and 18) is a view on line 15—15 of Figure 11 showing a detail of the bus bar connections appearing in Figure 11.

Figure 2:
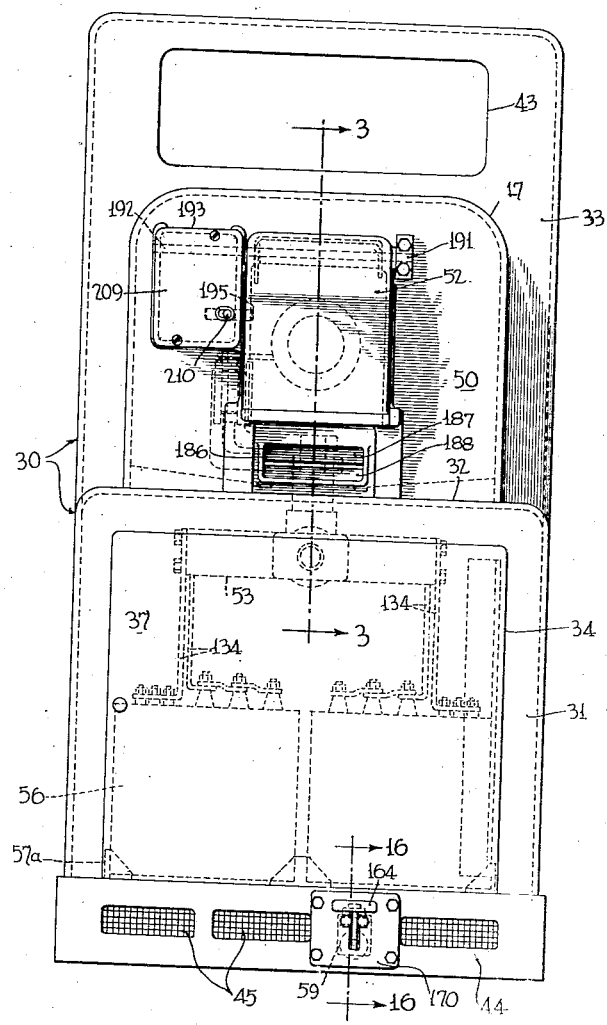
Figure 2 is a front elevation of the machine.

Figure 16 is a side elevation of the pedal-manipulated operating device for the mechanism of Figures 13 and 14, the view being taken approximately on line 16—16 of Figure 2, and showing in diagram its connection with the mechanism of Figures 13 and 14.

Figure 17:
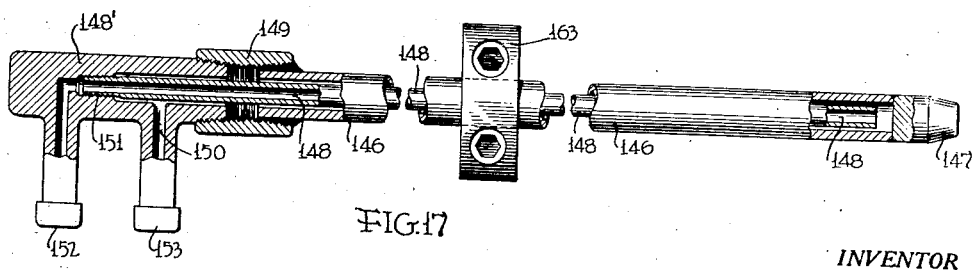

Figure 17 is a side elevation with portions in axial section of the push-out device such as used in the mechanism of Figures 13 and 14.

Figure 19:
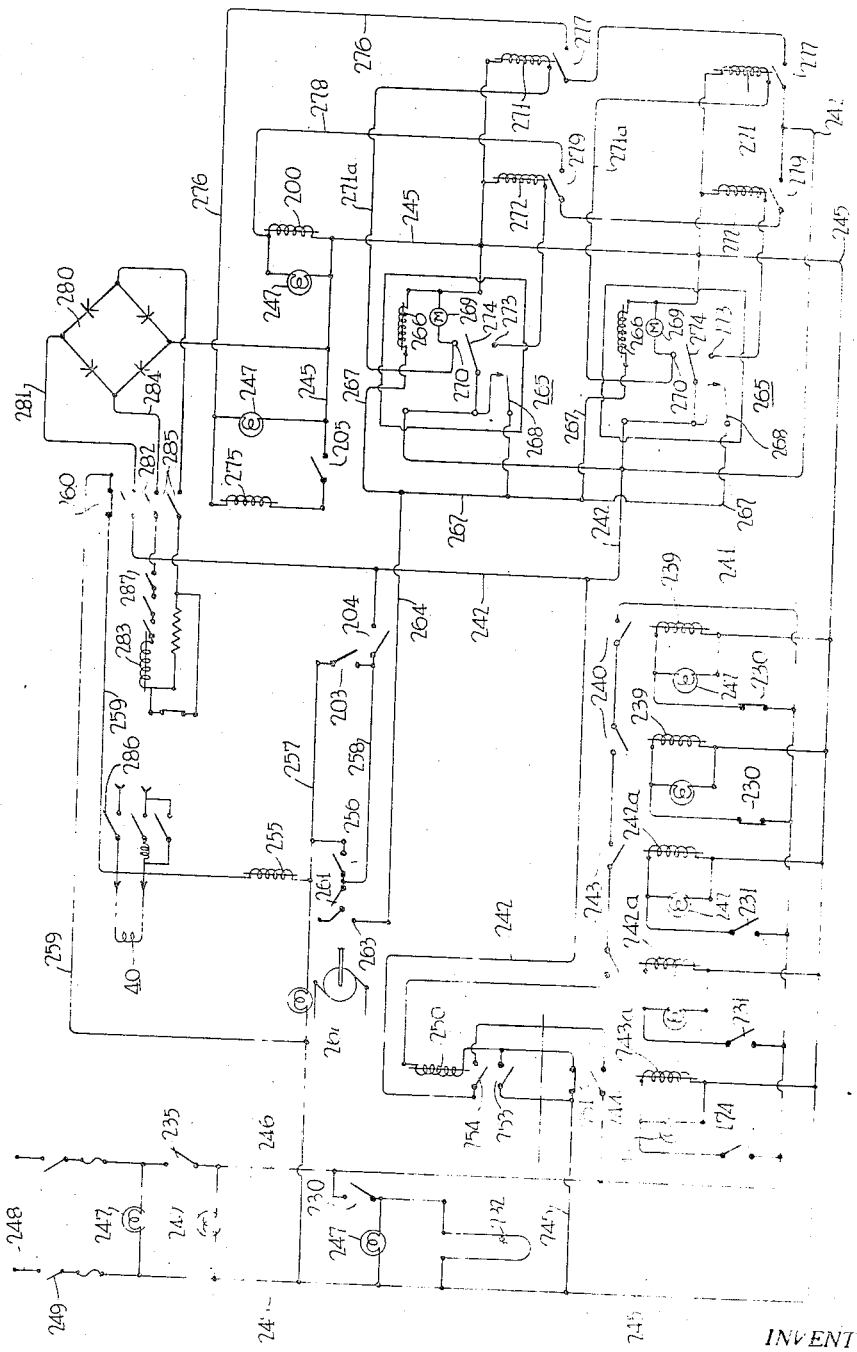

Figure 18 shows in front elevation the door to the furnace which governs access to the heating coil and the associated control cabinet, with portions in section and removed, the view being taken substantially on line 18—18 of Figure 1 looking in the direction of the arrows;

Figure 19 is a diagram of the electrical interconnections between the various instrumentalities through which the objects of automation, condition indicating, safety, etc., are attained;

Figure 20 is a diagrammatic plan view of the arrangement of the condenser units, their connections and their terminals within a single so called "can" of condensers.

Figure 21 on the sheet carrying Figure 12 is a perspective view of a bridge-piece connected with a heating coil support clamp.

Figure 22 on the same sheet is a transaxial segmental section showing the bridge-piece of Figure 21 in use in connection with a special heating coil;

Figure 23 appearing on the sheet containing Figure 4 is a fragmentary rear end view of a heating coil showing means for securing workpiece guide rails in connection with the special coil of Figure 22; and Figure 24 is the diagrammatic illustration of a modified form of the magnetic core.

Referring now to the drawings, and first to Figures 1 to 4, particularly Figures 1 and 2, it will be observed that I have made the frame and housing of the furnace machine 30 generally of L-shape as viewed in side elevation, and in form not unlike the operator's switchboard of a manually-operated telephone system. This is to say that the frame and housing comprise a horizontal branch 31 having a horizontal table-like top 32, and a vertically extending portion 33. I shall not go into the details of frame members and panelings of this frame and housing 30 further than to say that it is constructed of metal of a strength adequate to support the parts which I show and describe as supported thereby and housed therein. Front, side and back door openings 34, 35, and 36 (the latter not shown in form, although it is intended to extend the full length of the back of the housing 30) are provided for ready access to the various instrumentalities supported by and housed within the casing 30, and these openings are provided with suitable closures such as that 37 shown in the door opening 34 of the front of the casing, which closures may be provided, as is common, with suitable hinges and locks for ready manipulation and locking. An opening 38 in the top 32 of the table-like portion 31 is closed by a cast foundation member 39 which mounts the heating coil 40. An opening 41 in the lower section of the vertical portion 33 of frame 30 is closed by a backplate 42 which mounts the workpiece gauging and ejecting mechanism and the magnetic core of the coil. An opening 43 in the upper section of the vertical portion 33 of the frame is made for the mounting of the signal and instrument board (not shown), and is closed by this board when it is in place. Openings 44 in the lowermost portion of the casing are guarded by grillworks 45 through which the housing 30 is ventilated through suitable apertures in the upper parts of the housing (not shown). The upper parts of the housing (not shown). The hood 47 is provided with side and top ventilating openings 48 and 49. A front-plate 50 rising from the region of the foundation plate 39, coacts with the rear-plate 42 in supporting the hood 47. The front plate closes the otherwise open front end of the hood 47. The foundation plate 39, the coacting and surmounted back and front plates 42 and 50 (also castings preferably) and the hood 47 together constitute a housing unit individual to the heating coil 40 and its immediate appurtenant parts. The front plate 50 is provided with an opening 51 through which the workpieces are fed to the furnace by projecting them axially of the coil 40. A hinged door 52 closes or shrouds this opening during the heating operation.

A bus bar system 53 is housed in the portion 31 of the housing 30 just below the foundation plate 39 and tabletop 32. It is connected at 54 by suitable buses to a source of power through a contactor mounted in the cabinet (not shown) and by leads 55 extending vertically downward to the banks of condensers 56 which are mounted by porcelain insulators 57a on a system of rails 57 mounted transversely of the section 31 of the housing.

Figure 3:
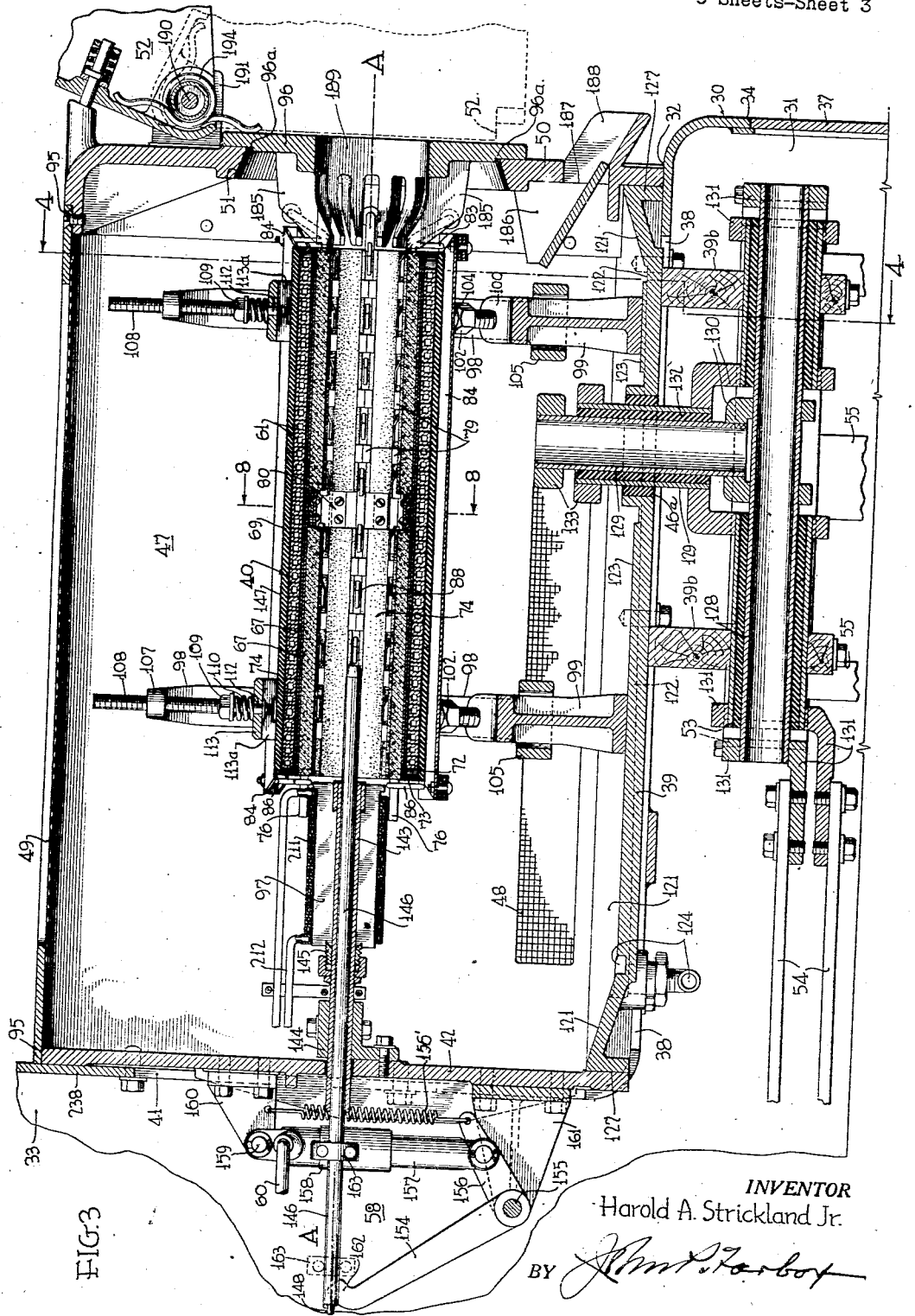
Figure 3 is a vertical section on line 3—3 of Figure 2, in a plane which includes the axis of the heating coil, outstandingly showing the heating coil and its immediate mounting and housing, the remaining portions of the machine being broken away.

Stock-gauge and push-out mechanism designated 58 and shown as mounted on the backplate 42, is accommodated within the vertical portion 33, as clearly appears in each of Figures 1 and 3. The pedal-operated actuating device 59 of this mechanism is, however, located in the bottommost part of the front section 31 of the housing and connected to the mechanism 58 by a conduit 60. The conduit 60 is preferably an overlong rubber hydraulic tubing whereby device 59 may be removed for services without removal of hydraulic fluid from the system.

Also housed within the vertically extending portion 33 of the housing 30 are the systems of water-cooling connections and their appurtenances, the subject of Figure 12, and the system of electrical control including its various instrumentalities as illustrated in Figure 19. There is room in the rear part of the housing 30 to house a power transformer. The lowermost part of the vertical section 33 houses the contactor and such connections as are needful to connect it to the source of power on the one hand, and directly or through a transformer to the buses 54 on the other.

The heating coil 40 and the supports for the workpiece within it are of a very special construction which appears oustandingly in Figures 3 to 9. The coil per se 40 is comprised of hollow conductors 61 generally of square shape. Cooling water in sufficient volume to cool the coil 40 is passed through the hollow 62 of this conductor. Individual turns of the coil (see particularly Figures 5 and 8) are insulated from each other by a spiral of mica 63 or the like, or else the conductor throughout its length may be wrapped with an insulating tape of an appropriate character, preferably heat-resisting, suitably impregnated with a suitable varnish after the winding of the tape is complete. If the conductor is so wound, then when the coil is wound on a suitable mandrel, there results inside and outside insulation 64, 65, as well as insulation 63 between the turns. The coil is wound on a suitable mandrel (not shown) preferably a collapsible mandrel. However, initially there is placed on a mandrel an innermost cylinder of high-grade mica sheets 66 capable of high-heat resistance and impervious to moisture and bonded with a resilient insulating varnish. Also superimposed on the innermost cylinder of mica 66 is a secondary cylinder of mica 67 which may be composed of "micanite" or other composite or compounded mica also bonded with varnish. Figure 8 is a section of one end of the coil, the right-hand end, as it appears in Figures 3 and 5. From this it will be seen that micanite cylinder 67 is shorter by a fraction of an inch than the mica cylinder 66, and that the endmost turn 68 of the coil 40 lies axially inwardly of the end of cylinder 67 a fraction of an inch, thus affording a stepped construction of the insulating cylinder ends. Coil 40 as insulated at 64, 65 is wound directly upon cylinder 67. Before the segmented strips are laid on, the coil is wrapped in a single layer of bonded mica set in varnish. This provides a very important seal against moisture if such should collect in the voids between the outside segments 69. Laid axially upon the exterior of coil 40 are segmental strips 69 of Micarta, Bakelite, or the like, which together completely encase the outer periphery of the coil 40. These longitudinally extending insulating strips 69 are bound in place by overlapped turns 70 of insulating tape given a water and moisture-proof treatment and baked. The opposite ends of the insulating strip 69 are provided with jogs 71 radially juxtaposed to the stepped ends of the insulating cylinders 66, 67. A series of mica rings 72 are laid over the end of cylinder 67 and against the end turn 68 of coil 40, and a unit insulating ring of Micarta or Bakelite 73 is laid over the end of mica cylinder 66, these rings completely filling the spaces between the endmost turn 68 and the ends of cylinders 66, 67 on the one hand, and of the strips 69 on the other. They are sealed in position by coating and baking with a resilient insulating compound. In such fashion the coil 40 is made and hermetically sealed inside, outside, and at each of its ends whereby heat may not crack the insulation, and moisture may not penetrate it.

Heat is prevented from being directly radiated from the red or white hot surfaces of a workpiece being heated to the mica insulating cylinders 66, 67 by an annular lining of insulating firebrick 74, also shown in Figures 3 to 5 inclusive. This lining of firebrick like the insulating outer covering 69 is comprised of longitudinally-laid segments. However, instead of conjoining the end edges and hermetically sealing together by intervened baked insulating compound, as in the instance of the bars 69, the individual segments 75 of this lining are spaced from each other by water-cooled work-supporting rails 76 intervened between them, and so constructed as to hold them radially outwardly against the surface of mica cylinder 66. To this end the opposite side edges of the segments 75 of the insulating lining (preferably comprised of a high-grade insulating firebrick compound) are chamfered at 77, the chamfer terminating in a slight jog 78, and the rails 76 are provided with welded-on sheet metal holding clips 79 of the form having a branch extending on each side of the rail 76 at the angle of the chamfer 77 whereby to lie flatly against the chamfer and within the depth of the jog 78.

The rails 76 are held radially outwardly by three sets of supports, one at the middle and one at each end. That in the middle is shown especially in Figures 5 and 6 to comprise an expanding ring 80 of sheet metal. The ring 80 is formed of the overlapping wings 81 of sheet or strip stock welded respectively to opposite sides of the rail 76, and joined in their overlapping portions by a clamping screw connection 82 having an appropriate lost-motion connection (not shown) between the overlapped ends permitting the expansion of the ring 80 to a diameter which moves the rails 76 toward or against the inner surface of the mica 66, and retains them in that position when the devices 82 are tightened up. Each of these joints is insulated by a set of amber mica washers 82a. These washers will stand a temperature of 1000° C. If these were not insulated, the ring would act as a short-circuited turn of a transformer.

The devices at the opposite ends of coil 40 are different. At the upper or right-hand end of the coil 40 as illustrated, there is secured to each rail 76 an outwardly and radially extended supporting stud 83. These studs are passed respectively through slots or holes, as may be preferred, in the outer ends of rails 84 of metal or insulating material (such as Bakelite or Micarta), the rails 84 being laid longitudinally over the length of the exterior of coil 40 to project slightly beyond each end. As shown, the rails are of channel cross-section to afford less generation of eddy currents as well as lightness with strength. At the opposite end (the left-hand end, as shown) the projecting ends of work-supporting rails 76 are engaged within the loops 85 of screw-hooks 86, the threaded outer ends of which are carried radially through apertures or slots in the opposite ends of the rails 84, there being preferably though not necessarily one securing rail 84 for each work-supporting rail 76. When the nuts 87 respectively on the ends of studs 83 and screw-hooks 86 are tightened up, they hold the outer ends of the rails 76 toward or against the inner surface of the mica cylinder 66 as does the expanding ring 80. Thus the rails 76 are held in position throughout their length and firmly hold the firebrick lining 75 in place. There may be provided as many expanding rings 80 as are needful to meet the requirements of coil length.

The securing clips 79 are not of an adjacent continuous series. They are separated by wide intervened spaces. In these spaces there are edge-welded in the radial planes of the coil axis A/A to the tubular rails 76, an intervened series of workpiece supports 88 in the form of sheet or strip metal fins whose lengths are axially extending. Their leading edges are chamfered as at 89, to prevent obstruction to the movement of a workpiece being inserted within the coil. They are spaced slightly at each end from the intervened firebrick securing clips 79. Their radially inner edges 90 are parallel to the axis of the coil 40 though not radially equidistant, and their locus is a cylinder of radius R whose center C is eccentrically above axis A/A of coil whereby the axis of workpiece of radius W coincides with axis of coil. (See Figures 6 and 7). The diameter of the locus cylinder of center C is slightly greater than the diameter of the heated workpiece to provide tolerance sufficiently great to prevent binding due to expansion. Rails 76, clips 79, expanding rings 80, and work-supporting fins 88 are all of high heat-resisting metal, especially fins 88. Water is continuously circulated through the tubular rails 76 in pairs in series, or in series as a group, the connection being generally illustrated by a dotted line connection 91 between the two outermost tubes 76 of Figure 5 shown as provided respectively with inlet and outlet openings 92, 93 at the opposite ends of rails 76. Inlets and outlets are each provided with moisture-discharging lips or flanges 94 which prevent accumulated moisture from running down the rails into the coil.

The entire system of equidistantly spaced polygonal workpiece-supporting rails 76 and firebrick lining may be bodily removed from the interior of the heating coil 40, by simply removing nuts 87 and the screw-hooks 86, radially removing bars 84, and drawing the ensemble axially outwardly (that is to say, to the right in the instant case). This enables the replacement of worn or broken firebrick segments 75, and repair to any of the rails which may for any reason need repair. To facilitate this the expanding ring 80 need not quite expand the rails 76 and the firebrick segments 75 into contacts with the inner mica cylinder 66, but provides such tolerance as will enable the ensemble to be slid longitudinally outwardly without intermediately releasing the clamping screws 82. Ring 80 and the connected rails are readily adjusted to tolerance diameters by fitting to a suitable mandrel and checking by a sizing ring before placing in the coil. However, if need be, a suitable tool will enable the clamping screws 82 to be reached, and one or more of them released. The individual segments 75 axially separated in the middle by the expanding ring 80 may be individually placed in position or axially withdrawn from the inner or the outer end of the coil, as the case may be, merely by loosening the respective screw-hooks 86 and studs 83 once the expanding ring 80 provides the proper tolerance at their axially inner ends. Thus removals and replacements may be made without removing the ensemble. All of this, of course, is readily achievable when the heating coil and the workpiece-supporting rail ensemble are disassociated from the housing. However, all of these operations may also be achieved while the coil and rail ensemble are in place on the machine, merely by removing hood 47 and front plate 50 and its supported parts as a unit. They together constitute a unit sub-assembly and may be slid off forwardly.

Heating coil 40 with its workpiece supporting appurtenances is mounted with its axis coinciding with a general horizontal axis A—A of the furnace machine, by supporting it from coil centering C-clamps 98 carried from and forming a part of pedestals 99 erected upon and secured to the cast foundation plate 39 of the table-portion 32 of the housing. There are two (or more in case of large coils) of these coil-supporting pedestals 99 spaced apart an adjustable distance to support coils of a number of different axial lengths without relocation upon the foundation plate 39. A reference particularly to Figures 3 and 4 will make clear their construction. The lower portion of the pedestals 99 has a plane of symmetry coincident with the vertical plane of the axis A—A upon which the coil 40 is to be centered. It terminates a considerable distance below the axis A—A, a distance sufficient to permit the accommodation of coils 40 of a number of different sizes. It is provided with integrally-formed right and left branches 100, 101 making equal angles with the vertical plane V—V of axis A—A. Threaded through the arms 100, 101 on radial lines intersecting axis A—A are radially adjustable coil supporting studs 102, 103. The heads of these studs 102, 103 are located toward coil 40 from the arms 100, 101, and support the coil directly upon pads of insulating material 104 secured to the heads. Thus by relatively adjusting studs 102, 103 the axis of a coil 40 of any accommodatable diameter may be placed directly upon the horizontal axis A—A of the furnace machine. In this case there is provided only one securing bar 84 for two rails 76, the two rails being bridged together and to the bar 84 by lateral extensions 84a and 84b having a rigid insulated connection with bar 84 and taking at their opposite ends the studs 83. Thus there is space for pads 104 directly to engage the coil, and more importantly rails 76 may be removed while the coil 40 is yet firmly clamped in position.

The C-clamps 98 of these supporting pedestals are comprised of C-arms, as clearly appears in Fig. 4, forked at their lower ends 105 to straddle the lower portions of pedestals 99 and be pivoted at 106 on the opposite side of the vertical plane V—V from the body of the C-clamp. When the clamps 98 are in clamping position, their upper ends 107 lie in the vertical plane V—V, and are provided with a threaded adjusting stud 108, the head 109 of which lies toward the coil 40 from the upper end 107 with the axis of the stud in the vertical plane V—V.

Beyond the head 109 projects a reduced extension of the stud 112 on which is radially slidably mounted a bridge member 113 carrying at its opposite ends pads of insulating material 113a. A spring 110 on the reduced section 112 and intermediate head 109 and bridge 113, presses the bridge toward the coil 40 to achieve yieldingly the clamping of it, while a washer and cotter 111 prevent the radially movable bridge from dropping from the reduced extension of the stud 112 when the clamp is released.

This clamping arrangement is not only adapted for clamping the coils of different diameters merely through the radial adjustment of stud 108, but also to clamp under different pressures through the adjustment of spring 110. Yet further, however, the structure of bridge member 113 is such that merely by rotating it on the reduced extension 112 of stud 108, it is adapted to engage with the top of one of the rails 84 instead of engaging between rails 84. See Figures 21 and 22 in this connection. Examination of these will show that pads 113a are elongated and provided in their middles with slots 113b of a dimension adapting them to fit over the top of a rail 84 when bridges 113 are rotated ninety degrees from the position shown in Figure 4. Thus coils having any desired arrangement of bars 84 may be used, and the smaller coils in which there are but three or four rails 76 and accompanying bars 84 may be accommodated as readily as the larger ones.

The arm 101 of the lower portion of pedestal 99 is extended laterally and widened in a vertical plane to form a mounting pad 115 for the bus bars 116 through which the power is applied to the opposite ends of the work coil 40. These bus bars 116 are two in number connecting one with each end of coil 40 through a bolted-on connecting clip 117, bolted flat against the side of the bus bar, and having a clamping connection 118 with the laterally-extending terminal 119 of the coil 40. The bars are insulated from each other and from the mounting pads 115 by blocks of insulating material 120, the outermost of which is utilized as a clamping plate to bolt the bars together and to the pads 115. There being two pedestals 99 and two pads 115, the buses 116 are rigidly supported in a horizontal position laterally of the coil, but parallel thereto.

The foundation plate or base 39 upon which the coil 40 is mounted through the pedestals 99 is, as has been said, a casting in this embodiment of the invention. It is formed with its upper face 121 on either side of the pedestals, slightly downwardly and inwardly inclined toward the vertical plane V—V whereby collected foreign matter or moisture will gravitate toward the center of the plate from both sides and from each end, the ends being similarly inclined. At the center of the plate and surrounding the region of mounting of the pedestals is an endless groove 122 which keeps moisture away from the pedestals and prevents its creeping upon them. The center of the casting is thus a pad 123 upon which the pedestals are mounted. Groove 122 communicates at its axially inner end with a drainage conduit 124 suitably connected to a drain, as will hereinafter appear. The under-margins 125 of base 39 are finished to rest upon the top of table 32 and be secured thereto by suitable bolts. The sides 126 are also finished and receive in overlapping relation the lower edges of the hood 41 secured thereto by suitable cap screws. These and no other screws are removed when it is desired to remove the hood and front plate assembly. The ends 127 of the plate receive in overlapped relation and bolted thereto if desired (bolts not shown), the end plates 42 and 50, thereby vertically aligning them with respect to the base 39.

Located centrally of the base 39 and upon the plane of symmetry V—V, is the aperture 46 previously referred to, through which the connections are made from the source of power connected with buses 54 and 53. The rectangular system of buses 53 emanates from concentric tubular conductors 128 lying in the plane of symmetry V—V and supported at its ends (or perhaps supporting) the rectangular system 53, each one of the tubes 128 of the concentric conductors being connected with one of the bars 53, and hence with one of the buses 54. Vertical risers 129 from the concentric conductor 128 emanate therefrom through nested connectors 130, each connecting one branch of the riser 129 to one branch of conductor 128. Insulation 46a protects them from ground on plate 39. As clearly appears in Figures 3 and 4, particularly in Figure 4, the inner of the connectors 130 connects the inner branch of riser 129 with the central portion of a continuous branch of conductor 128, the inner branch, while the outer connector 130 connects the juxtaposed ends of the two-part outer branch of conductor 128 to the outer branch of the riser 129. Their connectors 131 respectively space the branches of concentric conductor 128 apart from each other and maintain them apart through their connection with the branches of the bus system 53, or vice versa, the connectors 130 to the riser being rigidly maintained in spaced relation through the intervention of a spacing sleeve 132 of insulating material between the branches of the riser 129. This insulating material itself if sufficiently solid and firm in its seating, may be sufficient to retain all the parts of the bus and conductor system 53, 54, 128, 129 in spaced relations, insulating the various branches from each other. The bars of the rectangular system 53 are, as shown clearly in the plan view of Figure 11, bolted to the respective connectors 131 at each end. Thus the entire ensemble becomes a unit which may be separately fabricated and installed in the machine. At their upper ends the branches of riser 129 are respectively joined by clamped-on connectors 133 to the bus bars 116. Connectors 133 are angle-shaped extending radially laterally of the branches of riser 129, and then upwardly to have their outer ends respectively bolted to the buses 116. The axially inner set of connectors 131 of the ensemble on the other hand, also angle-shaped, have their axially inwardly extending branches bolted respectively to the bus bars 54 connecting with the source. Unbolting of this connection and unclamping of connectors 133 at the riser 129 enables the ensemble to be bodily removed. It is to be noted that the closely spaced relations of the concentric conductors 129 and the flat bars of the rectangular system 53 of the ensemble, as well as the nested and concentric relation of the parts connected with riser 129, and the duplex connections thereof to the outside bus, are such as to develop a minimum of impedance.

The ensemble is shown particularly in Figures 1, 2 and 4 as also directly connected with the banks of condensers 56 beneath them, the connection being by means of a system of vertically extending jumpers 134 respectively connecting the terminals of the condensers with one or the other of the branches of the rectangular bus system 53. The ring bus is supported from base 39 by tie rods 39a which clamp the ring bus between wooden separating blocks 39b. The relative arrangement of the condensers and their relative dimensions as respects the bus system 53 is such that the jumpers 134 are extended vertically upward from their terminal connections to engage the bars of the system 53 in vertical overlap. If desired, however, additional such support may be provided by suitable insulating blocks 135, the arrangement of two of which is suggested in Figure 4. Referring particularly to the plan view of Figure 11 in conjunction with the sectional elevation of Figure 4, it will be seen that in addition to having the rectangular bus system 53 encompass the entire bank of condensers and effect convenient connection of each individual condenser thereto through vertical jumpers 134, I have devised an arrangement of the opposite terminals 136, 137 of the condenser units within each so-called can 138. Upon the top of the can and in a plane substantially parallel to the plane of the bus bars 53, I can effect adjustment of condenser capacity and voltage with greatest facility. As clearly appears in connection with the upper right-hand can 138 in dotted lines, two groups 139 of condenser units of a given capacity and voltage, each having one terminal connected to a common lead 140 which is connected in common with the terminal 137 for which five connector bolts are shown adapted to join such terminal to one of the vertical jumpers 134. The independent terminals of each unit of each group are brought independently to one of the six independent terminals 136. The terminals 136 are arranged in two parallel rows lying toward one side of the can, while independent terminals 136 are arranged in two parallel rows lying toward one side of the can and common terminals 137 are arranged toward the other end of the can. In plan the axially extending branches of bus bars 53 pass midway between them whereby a vertical jumper 134 may conveniently connect with one of the independent terminals at the same time that another jumper 134 connects with a set of common terminals 137. Sets of transversely extending jumpers 141 of uniform dimension and of such length as to span from one independent terminal to the next adjoining of a transverse series of condenser units 139, enable the units of any given series to be connected in parallel with each other, and through the common lead 140, in parallel to the bus bars of system 53. Sets of axially extending jumpers 142 of uniform dimension and of a length enabling the adjacent groups 139 of adjacent cans 138 to be interconnected in series, span adjacent terminals of such groups. Thus as appears in plan view of Figure 11 particularly, adjacent independent terminals 137 of adjacent cans 138 have been generally connected together, with the exception of certain units or groups in the cans of the upper right of the view. When connectors 136 are applied, as shown in the remaining units, and connectors 134 are applied as shown, this results in placing across the bars of the system 53 ten rows of condensers, three units 139 in each row. Thus adding jumpers to include the remaining terminals 137 in the same manner as those already connected with jumpers, would result in so placing twelve rows of condenser units 139 of each row. Numerous other combinations are readily attainable merely by adding and subtracting jumpers, or by using various combinations of jumpers. Thus in an extreme case where very much higher voltage were to be applied, connection to terminals 137 would be omitted and one axially extreme set of jumpers 136 would be connected to one bus of the system 53 by one jumper 134, while the paralleling jumpers at the opposite end of the bank would be connected by another jumper 134 to the other of the bars of the system 53. Thus there would be provided six rows of six units 139 each connected with the bus bar system 53. These are but a few of numerous readily attained arrangements chosen for purposes of illustration to show the facility with which the voltage and capacity can by this arrangement be adjusted to the requirements of work coils of a wide variety of sizes.

The stock-gauge and push-out mechanism 58, 59, and the magnetic core 97 of the coil 40 associated therewith, all coact with the axially inner end of the workpiece at or near the axially inner end of the coil 40. While they are located generally in Figures 1 and 2, their detail is depicted generally in Figures 3, 13, 14, 16 and 17. Referring particularly to Figures 3 and 14 for the moment, it will be seen that the stock-gauge per se comprises a tubular arm 143 lying on the axis A—A of the coil 40, and supported from the plate 42 of the coil casing for relative axial adjustment by a clamping bracket 144 bolted to the plate 42. The tubular arm 143 projects rearwardly through the plate 42 a considerable distance allowing it to be axially adjusted back and forth through the clamp 144, to adjust its forward end with respect to the axially inner end of the coil 40, thereby to engage an inserted workpiece in different axial positions within the coil 40. Once adjusted for the proper gauging of the stock, for the proper heating thereof through the proper length, the gauge arm 143 may be firmly clamped in its supported position. (See Figure 3.)

Mounted on this adjustable arm 143, shown in Figure 3 as being fixedly mounted although it may be adjustable, is magnetic core 97 comprised of an annular series of radially-extending, radially-tapering laminations, the details of which are no part of the present invention and are, therefore, not shown. Sufficeth to say, they are bound in place upon the support 143 or equivalent support by any suitable means such, for example, as the commonly known interlocking tongue and groove device 145. This magnetic core is of considerable diameter and axial extent. Therefore, a considerable magnetic mass is shown as of approximately the diameter of the workpiece accommodatable by coil 40. As projected in juxtaposition to the end of a workpiece, it receives the flux flowing external to the coil 40, collects and concentrates it, and conducts it more or less directly axially inwardly of the inner end of the workpiece. Its utilization and relative adjustment with respect to the end of the workpiece very considerably reduces the reluctance of the magnetic circuit and affords a very flexible control of the distribution of heat in the heating of the axially inner ends of the workpiece. Thus with the proper gauge of the stock in position within the coil 40, plus adjustment of the flux through its axially inner end, irregular or imperfect heating or excessive heating in any portion in the inner end of the bar may be avoided. Thus it combines with such portion of the stock as may project from the outer end of the furnace to achieve a general reduction in the reluctance of the circuit.

The push-out mechanism comprises a preferably though not necessarily water-cooled push-out rod 146 working axially back and forth within the tubular workpiece stock gauge and support 143. It will be noted by reference to Figure 17 that this rod is water cooled all the way to its tip 147 by means of an internally-laid water-injection tube 148 which enters its tubular body by way of an elbow 148' connected with its rear end through a coupling 149. This water discharges through the main body of the rod 146, externally of the injection tube 148, through coupling 149, and through a hollow 150 in the elbow 148' in advance of the threaded connection 151 of the injection tube 148 therewith. Thus the elbow member 148' provides both an inlet connection 152 and an outlet connection 153. The engaging tip 147 of the push-out rod 146 is made of heat-resisting metal or other such material, and is preferably removably secured to the end in a manner not shown, but well known in connection with welding electrode tips and the like.

This ejector rod 146 is axially projectable through the tubular support and stock gauge 143 by means of the long arm 154 of a bell crank pivoted at 155 and whose short arm 156 is connected with piston 157 of a floating fluid pressure cylinder 158 linked at 159 to a bracket 160 secured to the rear face of plate 42. The spring 156' moves the arm 156 against the action of the piston and cylinder. Bell crank 154, 156 is itself supported along with other parts of the mechanism from a larger bracket 161 also secured to the plate 42. Engagement of arm 154 with the ejector rod 146 is a one-way engagement toward the coil through contact of its forwardly bent upper end 162 with an adjustable collar 163 about the rod, whereby the length of the rod may be made sufficiently great to enable it to be used in connection with workpiece stock of various lengths as associated with coils 40 of various lengths, the relation between the tip 147 and the collar 163 being appropriately adjusted to the ejection requirements of stock and coil sizes and positions and stroke of the push-out mechanism at large.

The stroke of the push-out mechanism is achieved by fluid pressure applied through conduit 60 from a master cylinder 59 of the automobile brake type operated by foot pedal 164. The system is kept filled from the usual reservoir 165 as in the automobile practice. The stroke of cylinder 59 and hence of the ejector rod 146 is regulable by an adjustment of the leverages through which foot pedal 164 is connected to the piston rod 165' of cylinder 59. Pedal 164 is a bell-crank whose short arm 166, to which retracting spring 167 is connected, is adjustably fulcrumed at 168 upon a fulcrumed bearing bracket 169. Bracket 169, together with pedal 164 and cylinder 59 and appurtenant parts, are all borne from a removable mounting plate 170 bolted to the face of the housing section 31, whereby the ensemble of this foot-pedal-operated actuating mechanism is removable as a unit from the housing 31 through the opening 171, without disconnecting from hose 60, and to the extent permitted by the provided length of flexible hose 60, merely by disconnecting the plate 170. A heel 172 on lever 164 abuts the inner face of the mounting plate 170 at the outer extreme of the stroke. Further stroke adjustment can be had through the screw-threaded adjustment of piston rod 165' with respect to link 173 by means of which it is connected to pedal 164.

Workpiece stock-limiting switch 174 (see Figures 13 and 14) is also operated in connection with the push-out rod 146. This is achieved through the long arm of bell-crank lever 175, 176, which long arm through a forwardly projected end 177 also has a one-way forward engagement with the adjustable collar 163. Like the bell-crank 154, 156, the bell-crank 175, 176 is freely journalled on the pivotal shaft 155. Unlike the bell-crank 154, 156, the arms of which are integral, the bell-crank 175, 176 has its arms relatively adjustable, the short arm 176 being adjustably clamped by a split collar 178 surrounding a lateral extension 179 of the hub of the long arm 175. Arm 176 forms a segment about the axis 155, and on the outer arc-shaped periphery 180 of this segment rides the switch-actuating roller arm 181 of the limit switch 174. Bell-crank 175, 176 is biased toward a forward position by a spring 182 extending to back plate 42, and the roller of roller arm 181, when the bell-crank is in its extreme forward position and the workpiece has been pushed out, engages in an arc-shaped depression 183 in this segment. By angularly relatively adjusting the arm 176 with respect to arm 175, the action of limit switch 174 may be adjusted effectively for each adjustment of collar 163. Switch 174 is mounted upon a bracket 184 also borne by back plate 42.

Devices associated with the feeding-in of the workpieces on the other hand, are mounted in connection with the front plate 59 of the housing of coil 40. These are the coil mouthpiece 96 and the door 52 and appurtenant instrumentalities. The mouthpiece 96, as has been said, serves to center the workpieces of bar or rod stock properly upon the axis A—A of the coil 40 and the supporting rails 76. It is by virtue of its susceptibility to removal and replacement from the opening 51, suited in size to the various sizes of coils and stock. It is suitably bolted in place (bolts not shown) and mounted with a clearance 96a for radial adjustment to precise position on axis A/A. On its inner side it is provided with an annular series of axially and inwardly projecting spaced teeth at 185, the inner side walls of which project radially and axially inwardly toward the coil, and the extremities of which have an extent substantially paralleling the axis A/A and lie on a circle substantially of the same diameter as those circles on which lie the inner edges of the work-supporting fins 88, while their inner sides meet their inner ends at a relatively sharp angle. All this clearly appears in Figure 3 and Figure 5. Thereby these teeth guide the stock accurately into engagement with the fins 88 of the supporting rail 76, preventing impingement upon intermediate transversely-extending walls (this through their inclined inner walls and their extremities), and when the workpiece is pushed out, remove from it foreign matter such as light scale which may have formed (this through the sharp innermost edges). Such foreign matter as is removed falls between the teeth or past their inner extremities and upon the hopper plate 186 which discharges through opening 187 to a chute 188 projected from the opening 187 exteriorly of the machine. Thus no scale or other foreign matter drops to the foundation plate 39.

The door 52 which normally closes the mouthpiece opening 189 is hinged on a transverse axis 190 (see Figures 18 and 3) just above the opening 51, the hinging being achieved through a journalling of the axis shaft 190 at one end in a small exterior bracket 191 and, at the other, in a journal 192 in a control box casing 193. Like chute 188, bracket 191 and the casing 192 may be cast integrally with the plate 50. However, the control box 193 especially may be separately formed and mounted to facilitate control assemblies therein. Door 52 is biased to a normally open position in which it is raised vertically as shown in Figure 3 by means of a strong spiral spring 194 on the axis 190 reacting, at one end, against the front plate 50, and at the other end against the door 52. However, the door may be latched when moved downwardly against the pressure of spring 194 to engage the end of a latch bolt 195 operated from a latch mechanism within the control housing 193. The door 52 is in the form of a hood, as will most clearly appear from an inspection of Figures 1 and 2, a hood open on its rear and undersides and axially sufficiently long to accommodate a considerable length of stock projecting axially outwardly of the mouthpiece 96. Such a hood-like door 52 at one and the same time enables stock considerably greater length than its portion to be heated, to be handled in and out of the furnace, without interference from the door when in closed position, safeguards the operators from contacting the outer end of a highly heated piece of stock (which, in case of electrical failure in the coil might be at high potential) and, through the substantially flush engagement of its inner edges with the front face of the plate 50, prevents somewhat escape of heat by convection. Note especially the position illustrated in Figure 1.

Control box 193 contains a latch mechanism 196 controlling the latch bolt 195 for holding the door in closed position, the door-operated control switches 197, and an electric terminal bar 198. The latch-bolt-operating mechanism comprises spaced guide mountings 199 for the inner end of the latch bolt, and the latch-bolt-operating solenoid 200 connected to operate latch bolt 195 through a bell-crank lever 201, one arm of which engages with a collar 202 on the latch bolt 195. When the solenoid draws its core up, the latch bolt is retracted and the trap door is sprung upwardly to afford access to the outer end of the stock which it has hitherto shrouded.

The bank of control switches 197 are of the "micro" type. There are three of them shown in front elevation, numbered, respectively 203, 204 and 205. They are each as shown actuated from the axis shaft 190 through operating arms 207 secured by clamp 206 to shaft 190 and oscillable with it. The shaft 190 is rigidly connected with door 52 by means such as pin connection 208, although any other such means may be used. Thus, when spring 194 moves the door upwardly or when the door is manually moved downwardly, the bank of switches 203, 204, 205 is operated. The control box 193 is normally closed by a suitable cover 209 appearing in the front elevation of Figure 2. A small handle 210 projected radially outwardly through the cover from bolt 195 affords a means of manually operating bolt 195 independently of the solenoid mechanism 200, 201. Projection of the latch bolt is by means of spiral spring surrounding the bolt between the collar 202 and the guide 199, as shown.

Viewing now the ensemble of all instrumentalities connected with the housing of coil 40, especially with the foundation plate 39 and the front and rear plates 42 and 50 which are erected thereon, it will be seen that all of these instrumentalities can be removed as a unit with the housed coil 40, if this be desired, merely by unbolting the foundation plate 39 and the back plate 42 from the faces of the principal housing 30 of the machine, the electrical, water and other connections having been previously broken. It will, of course, be particularly necessary to remove the bus bar system 53 by disconnection at the connectors 133 and appropriate lowering of the bus bars. This makes for convenient major subassembly and shifting of such major subassembly from machines to test bench or back, or substituting one such major assemblage from one machine in another, and so forth. Normally, however, the subassembly comprising plate 50, door 52, box 193, and hood 47, is the unit removed, leaving base 39 and plate 42 on the main frame. This alone gives four-sided access to the coil 40 as clamped in place.

Effective provision is made for water-cooling of all parts whatsoever, such as heat in what otherwise would be an undue measure. This includes not only the coil 40 and its work supporting rails 76 and the water-cooled push rod 146 (mention of the hollow conductors for water-cooling of which has already been made), but also the iron core 97, the condenser banks 56, and any transformers which may be used. A coil of water-cooling tubing 211 is provided about the magnetic core 97 for the purpose of cooling this mass of laminated transformer iron. The internal annular cooling of the push-out 146, as shown in Figure 17, also aids in cooling the core 97. The coil 211 is closely heat-coupled to the laminations 97 and provided with appropriate inlets and outlets 212. The water-cooling system at large is illustrated in diagrammatic form in Figure 12.

Here we have shown a principal water inlet 213 projected through a shut-off valve 214 and a large strainer 215 to a general machine-distributing main 216 extending by appropriate branches to all apparatus to be cooled. Main 216 connects with the ingoing terminal of coil 40 at 217, with the in-going termini of the rails 76 at 218, with the inlet to the cooling coil 211 of the magnetic core 97 at 219, with the push-out rod 146 at 220, and with the water-circulating inlets of the condenser banks at 221. Similar such connections as those made to coil 40 and condensers 56 may be made for transformer coils where transformers are used. The outlet connections of these respective instrumentalities are for the coil 40 at 222, for the rails at 223, for iron-core-cooling coil 211 at 224, for push-out rod 146 at 225, and for the condenser banks at 226. These outlet connections connect in common to the drain connection 227. Inasmuch as electric potentials appear across several of these water ports, it is necessary to make water connections through electrically insulating water conductors. This is done, for instance, in the cases of the heating coil, cooling coil for laminations, individual capacitors, etc. However, in connection with various of these instrumentalities, there are provided control and signal actuating devices intervened between the inlet main 216 and the drainage main 227, respectively. Thus, while the inlet connection 217 to coil 40 is made directly with the main 216, the outlet connection is by way of a conduit 228 through a thermostat connection 229 governing a control switch 230 and through a water-flow control switch 231. Thus, the inlet connection 218 to the work-supporting rail system 76 is not, as in the case of the coil

40, direct to mains 216, but by way of an electric or other water heater 232 and a branch 233 whereby the water reaching the rails is heated to a temperature such that moisture condensation or collection on the rail 76 is prevented, irrespective of the state of use of the furnace. A bypass 234 from the heated water line 233 to the rail 76 supplies water also to the cooling coil 211 of the iron core 97. This coil may be supplied directly from main 216, if desired, but the connection illustrated is preferable. Similarly flow-controlled switches like 231 and thermostatically controlled switches like 230 may be utilized and are intended to be utilized in connection either with the condensers 56 or any other instrumentalities where it is desired to individualize indicator switch and machine control due to temperature or flow of water connected with such instrumentality. An extra group of such devices 230 is shown unconnected and is intended to represent connection to any other such instrumentalities in the same manner as connected with the coil 40 through branch 228. A pressure-operated switch 235 is connected through pressure diaphragm 236 with the mains 216 to indicate through its action the fact that cooling water is on the system. Drain opening 124 of the base plate 39 is connected to a separate drain 237 used to prevent possible back pressure from line 227 forcing water into base pan.

This ensemble of the water-cooling system is, as heretofore stated, installed appropriately within the vertically extending section 33 of the main housing 30 and is, for the most part, mounted upon the rear of the general vertical partition wall 238 which is extended downwardly near to the bottom of the casing and upon the side walls of this vertical section 33 in any suitable manner.

The systems of electrical control connections and the contactor system for connecting to the source of power, as illustrated in Figure 19, are also mounted within the vertically extending section 33. Except the main bus bar contactors, they are mounted on the back wall 36 which may be constructed in the form of a door to be swung outwardly to afford access to the compartment 43 in a manner not shown. The contactors connected with the source of power are preferably mounted either upon the partition wall 238 or upon the side wall of section 33. Inasmuch as the particular places and modes of mounting form no part of my invention, they are not illustrated. As disclosed in the diagram of Figure 19 however, there are provided the following electrical control instrumentalities. In addition to the indication and control switches of the order of switches 230, 231 and 235 of the water-cooling control system, there is connected to be operated from each thermostatically-controlled temperature switch 230, a relay 239, the circuit of which is normally closed by switches 230 as long as the temperature of the cooling water is below a dangerously high value. Relays 239 close and maintain closed under conditions of normal water temperature, contacts 240 in a series-control circuit 241. A relay 242a is controlled by each water-flow control switch 231 (see Figure 12 for the relation of switches 230 and 231 to the water-cooling system). The circuits of said relays 242a are closed when the flow of water is established in the cooling system and they in turn close their respective contacts 243 also in the series-control circuit 241. A relay 243a whose circuit is controlled by the workpiece stock limit switch 174 (see Figures 13 and 14) is closed when the workpiece is in place against the stock gauge to in turn close contacts 244 in a second control line 242. Thermostatically-controlled switch 230 closes the circuit of water heater 232 for the cooling of rails 76. The pressure-operated switch 235 places potential on the main bus lines 245, 246 of the control system. Switchboard signal lamps 247 are connected in order, one across the lead-in of the control bus line 245, 246 from the alternating-current low voltage means 248 through line switches 249 in advance of the pressure control switch 235, one across lines 245, 246 behind the pressure switch 235 and illuminated when the pressure switch is closed by turning on the cooling water. The lamp 247 in parallel with the water heater 232 is controlled by the thermostatic switch 230. One such lamp is in parallel with each of the several relays 239, 242a and 243a, respectively indicating the "on" condition of the associated relay. An anti-reset safety relay 250 circuit is controlled jointly by control line 241 in which all contacts 240, 243 are in series with those of pressure switch 235, and a normally closed contact 251 of the workpiece loading limit switch 174. The normally open switch 174 controls relay 243a. Relay 250 carries a normally open locking contact 253 and a normally open control contact 254 controlling, in series with contact 244 of relay 243a (the load limit switch relay), the application of potential from bus 245 to control line 242. The three switches 203, 204, and 205 are operated by the door 52 (see Figure 18) when the door is manually closed, switch 203 being a momentary switch or a passing contact switch, while switches 204, 205 remain closed as long as door 52 remains closed. The contactor pilot relay 255 initially receives its potential from control line 242 by way of switches 204 and 203, and then locks up by its normally open locking contact 256 which connects its circuit 257 by bypass 258 around momentary switch 203 and back through switch 204 through the control line 242. The circuit of relay 255 is completed through a conductor 259 and normally closed contact 260 to bus 245. A sequency controller connects contact 261 placing potential as derived from control line 242 by way of switch 204 and branch 258 upon sequency controller 262, which sequency controller is a chronometrically-operated device adapted to apply, in desired timed sequence and in succession with or without overlap of connection, the connection of a multiple number of machines such as the instant one to the same source of power, each machine being connected by program or requirements (disconnection is by means of the individual furnace machine's own timing). Contacts 263 of such controller apply potential derived from control line 242 over branch 264 to the timers. Two timers 265 of identical construction are set to start and stop at the same times and thereby to impose simultaneously upon the control circuits and in synchronism the same controlling time intervals. The timer-controlling relays 266 operate over parallel controlling circuits 267 receiving potential from line 264, and having their return circuits connected directly to control bus 245 which is directly extended to the timers. Certain locking contacts 268 are opened by means of unloading the stock which opens load switch 174 which opens relay contact 244 which removes voltage from solenoids 266 permitting spring reset within timers. Motors 269 circuits are closed at normally open contacts 270 when the relays 266 are energized. "On" relays 271 have their circuits closed by the same contacts 270. Both the "on" relays 271 and the motors 269, like the timer relays 266, have a return connection directly to bus 245. "Off" relays 272 are closed at contacts 273 when motors 269 are de-energized which, like the motors 269 and the "on" relays 271, are subjected to potential by way of contacts 274 connecting with the control line 242 which, it will be recalled, derives its potential from control bus 246. Main contactor relay 275 has a circuit 276 derived from control line 242 by way of contacts 277 of relays 271 in series. The return line connection to bus 245 is by way of the normally open switch 205 controlled by the furnace door 52. Signal lamps 247 are connected in parallel with each of the relays 269 and 275. The furnace door latch-releasing solenoid 200 (see Figure 18) has its circuit 278 from the control line 242 to the return bus 245 controlled by way of contacts 279 of relays 272 in series. An A. C./D. C. rectifier 280 shown in diagram derives its power from the A. C. bus bars 245, 246 over an extension 281 from the control line 242 by way of normally open contacts 282 of the main contactor control relay 275 which, it will be remembered, also controls contact 260 in the circuit 259 of the pilot relay 255. The main contactor itself 283 controls the application of high-frequency high-power current to coil 40 of the furnace, which main contactor 283 receives its power over D. C. circuit 284 closed by contacts 285 of relay 275. The main contactor contacts 286 are those through which the high-frequency high-power current is cut on and cut off of coil 40, or an intervened transformer supplying coil 40 and any associated condensers.

The operation of the machine is as follows:

Water having been turned onto the water circuits of Figure 12 in advance, water pressure switch 235 (follow Figures 12 and 19), thermostatic switch 230 of the heater 232, and thermostatic and flow switches 230 and 231 associated with the remaining cooling fluid circuits, are all closed and the various associated indicating lamps 247 are illumined, showing that they are closed. Should any one of these switches be opened due to the absence of the condition which actuates it, the associated lamp will be out, showing the operator where trouble may lie. Closure of these several switches results in the closure of the circuits of each of the associated relays 239 and 242a, and their closure in turn of their contacts 240, 243, which in series establish the continuity of the preliminary control line 241 which governs the heat control or anti-reset relay 250. Inasmuch as a workpiece has not yet been placed in the machine, contacts 251 of relay 243a, which complete the connection of circuit 241 to control bus 245, are still closed. Relay 250, therefore, pulls up and locks itself up past contacts 251 by locking contacts 253. Relay 250 also closes its contacts 254, thus conditioning control line 242 of the system to receive potential from control bus 246 by way of the still-open contacts 244 of relay 243a which is under the control of the workpiece-actuated switch 174.

The door 52 being in the raised position shown in full lines in Figure 3, a workpiece in the form of a bar of appropriate cross-section and length is introduced through mouthpiece 96. Preferably, in this case, the workpiece is round, and of a length such that, when its inner end is against the inner end of the stock gauge 143, its outer end projects outside of the mouthpiece 96 at a distance beneath the hood-like door 52. The door 52 is then closed downwardly.

The act of placing the bar in heating juxtaposition to the coil engages its inner end with the tip 147 of the push-out rod 146, moving it rearwardly. This movement carries collar 163 rearwardly, moving locking arm 175 (see Figures 13 and 14, particularly) rearwardly, and, through cam arm 176, closes the loading switch 174. This switch, it will be recalled by reference to Figure 19, closes and retains closed the circuit of relay 243a which in turn closes its contacts 244 which lie in the control line 242. Control potential thus becomes applied to line 242 through the closed contact 254 of the lock-up heat control relay 250. Simultaneously, relay 243a opens its contacts 251 so that, should heat control relay 250 become de-energized and its now-closed locking contacts 253 be opened, the relay cannot again be energized until the workpiece then in the machine has been removed.

The closing of furnace door 52 downwardly to the dotted-line position shown in Figure 3, engages it with the latch bolt 195 and becomes latched in its closed position, though biased to the open position by spring 194 (see Figure 3). In moving downwardly, door 52 rocks shaft 196, and through arms 207 closes the three micro-switches 203, 204, 205. These switches appear in the upper central portion of the diagram of Figure 19. Switches 204 and 205, when closed, remain closed as long as the door is closed. Switch 203 is adjusted for but momentary contact during the final passage of the door to full-closed position and is thereupon immediately re-opened. The door 52 has small amount of over-travel for this purpose, being closed beyond latching position and then drawn back by spring 194 against bolt 195. This backward travel releases switch 203, but switches 204 and 205 remain closed. Thereby pilot relay 255 is energized over its circuit 257, 259 and normally closed contact 260 of contactor relay 275, and pulls up its contacts 261 and 256, locking itself up by the latter through the continuing contact 204 of the group 203, 204, 205 operated by the door. The sequence-controlling switch 262 which governs the placement of potential from extension 258 of the control line 242 through contact 261, to contact 263 of the controller, operates continuously, so placing potential sequentially upon a series of furnace machines. When the turn of this particular machine comes in the sequence, contact is made at 263 and potential is carried over line 264 and the branch 267 to the starting relays 266 of the pair of timers 265 which jointly control the heating cycle of the machine.

These timers are of the well-known Eagle Signal Corporation type, which, when energized, operate through a predetermined heating cycle period and then automatically close the period. Relays 266 pulling up, transfer the potential from lines 267 through contacts 274 of the relays to terminals 270, from which there are simultaneously energized the driving motors 269 of the timers and the extension control relays 271, the latter being energized over branches 271a, both the motors 269 and relays 271 having return line connections directly to the main control bus 245. Relays 271 through their contacts 277 in series close the circuit from control line 242 by way of conductor 276 to contactor relay 275. The motors 269 start the timers upon their adjusted time cycle. Contactor relay 275 reaches control bus 245 through the continuingly closed contacts 295 of the door 52 and is therefore energized. It pulls up its contacts, opening 260 and thereby releasing the pilot relay 255 which may not be again operated until another cycle is instituted, thereby releasing the sequence controller from all connection with the timers of this particular furnace until the machine has been reloaded. Relay 275 simultaneously closes its contacts 282 and 285 to the rectifier 280, thereby supplying direct current to the contactor magnet 283 and operating the switch points 286 to connect the source of power on to the coil 40. The actual heating cycle of the workpiece is thus started substantially at the very moment that the timers 265 are started upon their timing cycle.

This heating cycle continues until motors 269 have completed their predetermined cycle of operation. As the motors close their cycle of operation, they operate upon a mechanism not shown here and not necessary to show, to bring about a movement of contacts 274 away from contact points 270 under the control of timer relays 266, and into engagement with contacts 273, without in any wise affecting the energization of relays 266 which remain locked up through contacts 268. The break between contacts 274 and contacts 270 not only stops the revolution of the timer motors, but also removes potential from relays 271 which latter, opening their contacts 277, open the circuit of the relay 275, which in turn opens its contacts 282, 285, removing potential from contactor 283 and cutting off power from coil 40 at switch points 286, thus closing the accurately-timed heating cycle for the workpiece. The movement of contactors 274 against points 273 at this close of the heating cycle places potential on relays 272. These close their contacts 279 in series, completing circuit 278 to the door latch solenoid 200 (see Figure 18 again), releasing the door 52 which thereupon flies to its open position shown in full lines in Figure 3, opening its controlled contacts 204, 205. If either timer fails for any reason, the operation of the remaining timer is such as to open the main contactor and interrupt the heating at the proper time.

Thereupon the heated workpiece may be removed simply by pushing downwardly on foot pedal 164 (see Figures 1, 2, 3, 13, and 14). This actuates cylinder 158 to rock crank 154 about its axis 155 to engage the upper end of the crank with collar 163 on push-out rod 146, therethrough to push the workpiece axially outwardly. Simultaneously, it may be grasped in suitable tongs and removed for placement in the forging machine or other instrumentality used to treat or form it.

Upon the removal of the workpiece the load switch 174 is opened, de-energizing relay 243a, opening points 244, and removing potential from control line 242 and unlocking timer relays 266 at contacts 269. Until relays 266 are unlocked the timers cannot be started upon a new cycle.

All during the heating cycle, the various signal-indicating lamps 247 are illuminated to show that each instrumentality of the controls of a machine is functioning properly. Should any one of them not be functioning properly, the corresponding lamp 247 is extinguished and an operator will know precisely where the trouble is to be found. The same, of course, is true at any time during the operation of the machine, and before the heating cycle is instituted, insofar as those instrumentalities in operation before doors 52 are closed are concerned, as, for example, where those thermostats 230 closing switches 231, water pressure operated switch 235 and the like, are concerned.

If the heating cycle be interrupted through any disorder, through failure of the source of power, failure of water, or the like, relay 250 and its associated circuits come into play to require that the machine be unloaded and again reloaded before it can be again started. This is so because once relay 250, which is self-locked at contacts 253, has been de-energized through removal of power from the control buses 245, 246 or through the opening of any of the contacts 240, 243, it cannot again be pulled up to condition the control circuit 242 until the workpiece then in the machine has been removed, thereby opening the workpiece limit switch 174 to de-energize relay 243a and close its points 251. The latter are retained open as long as there is a workpiece in the machine. This is simply because as long as a workpiece is in the machine, the push-out rod 146 through collar 163 retains rock arm 175 in its rearward position against the tension of spring 182, in which cam 189 retains switch arm 181 raised and switch 174 closed. Thus an operator is compelled to notice that a workpiece has been partially heated and refrains from replacing it in the machine until after it has been cooled. Overheating of a workpiece through subjection to one whole heating cycle and after exposure to a fraction of a prior heating cycle is thus prevented.

My invention is susceptible of many modifications of its various component parts and their coacting inter-relationships and organizations. For example, the heating coil itself may be variously modified. I show in Figure 10 one such modification in which the rails 76 comprise each two tubular devices welded together in the radial plane whereby to give them greater radial depth and stiffness. The retaining clasps 79 and the fins 80 are in turn welded to the radially inner such tubular sections. Cooling water is passed through both of the tubular sections. It may be passed down one such tubular section and returned by the other, or it may be passed through them in parallel as may be desired (such connections not being shown). This organization of the work-supporting rails permits a greater depth of heat insulating segments 74 and, of course, connotes a larger diameter of coil relative to the diameter of the workpiece, (the latter shown in Figure 10 generally in dot-and-dashlines).

In this description I have described timers 265 as chronometrically-operated devices. They might equally well be thermometric-timing devices actuated after that length of time required to heat the workpiece to a determinate temperature through a photocell responsive device of any well-known type.

In connection with the laminated iron utilized in the magnetic circuit in extension of the axis of the workpiece, one form of this core has been described. The best distribution of heat in the end of the workpiece (and it is an aim of this laminated iron to secure better distribution of heat in the end of the workpiece) I conceive to be had when the diameter of the engaging end of the core is less than the diameter of the workpiece, by substantially about twice the skin depth of current penetration in the workpiece. A diameter of the engaging end of core about two-thirds of the diameter of the workpiece is believed by me to be a good proportion. Thus two important advantages of the inclusion of the core are conjoined, the collecting of the coil flux and in reducing the impedance, and uniform heat-distribution in the juxtaposed end of the workpiece.

In Figure 24 I show diagrammatically only another form of the core 97 of transformer iron. It is the same in its general arrangement as that set forth in the principal figures of the drawings, but differs therefrom in having its forward end 97a reduced in diameter to such an extent that at its extremity it is less in diameter than the diameter of the workpiece W. This reduction, as illustrated, is attained by tapering the laminations radially inwardly, but it may be reduced in other ways. The proportions I have set forth above. While the main body 97 and coil 211 may be projected within the open end of the heating coil to meet the workpiece W, an end 97a of reduced cross-section can all the more readily be so projected as shown.

In closing I would draw attention to the safety functioning of contacts 204, 205, always closed when the door 52 is closed. Whenever door 52 is open or becomes open for any reason, before a prescribed heating cycle has been completed, these two switches are opened. 205 immediately de-energizes the contactor relay and removes power from the heating coil. Contactor 204 immediately removes potential from the sequence controller 262. If the sequence controller has not started the operation of the timer relays, it therefore cannot institute such operation until the door 52 has been again closed, and the entire sequence of events reinstituted. This may involve waiting for a following cycle of sequence controller, for the contactor relay unlocks relay 255 controlling the connection of the sequency controller. If switches 204, 205 are opened by door 52 before the heating cycle has been commenced, of course power will be prevented from being applied at all until the sequence is reinstituted.

Attention is called to the presence of the three switches 287, illustrative of the switches connected with the various doors affording access to the interior of the housing 30, which switches are closed when such doors are closed, and without the closure of which it is not possible to have potential upon relay 283, and so start a heating cycle.

The divisible features of this disclosure relating to the furnace cooling system, the load push-out mechanism, and the furnace door control mechanism are contained in applicant's copending applications Serial No. 603,197 on "Furnace cooling systems," filed July 4, 1945; Serial No. 640,228 on "Work expulsion mechanism for furnaces," filed January 10, 1946; and Serial No. 652,931 on "Door control mechanism," filed March 8, 1946.

Throughout the specification I have used the term heating coil to apply to the electromagnetic inducing element to which the workpiece is juxtaposed to receive the electromagnetic induction. This term I wish broadly construed to comprehend the electromagnetic inductor devices of all sorts irrespective of the shape and dimensions of the coil and indeed irrespective of whether or not a device has the form of a coil and is but an electrical conductor of some form or other, save as the claims specify otherwise.

The door when closed functions as a lock to prevent removal of the work before the end of the heating period. The anti-reset relay 250 may be opened by any one of a number of abnormal conditions such as a sudden shutting-off of the power from the supply line, an excessive increase in temperature of a coolant being discharged, an inadequate rate of flow of the coolant, or insufficient pressure on the coolant for the various parts of the apparatus. After the relay 250 has been opened by some such abnormal condition the main switches 286 are locked in their open position, in the sense that they are not adapted to be closed in the usual manner until the work has been removed and another work-piece reinserted. While the timer is automatically responsive to time, nevertheless since the timer causes the work to be heated to a predetermined amount, the timer may be regarded as a means for accomplishing such a result.

Thus it is that I would call attention to the fact that it is my desire that the annexed claims be afforded breadth of interpretation commensurate with the spirit of my invention wherever that spirit is manifest and novel, irrespective of circumstantial terminology which my present description of the instant embodiment of the invention, may have influenced me to use.

The construction of the heating coil, its mounting, the track along which the work slides, the mouth 96 and the end extension core 97 are claimed in my application Ser. No. 411,297, filed Sept. 18, 1941, (now Patent No. 2,365,021, dated Dec. 12, 1944) for "Electric furnace machine," the same being a division of the present application.

What I claim is:

1. An apparatus for heating a workpiece by electromagnetic induction comprising an inducing coil, a source of power therefor, means for connecting said coil and source of power, a timer for disconnecting said coil and source of power after a predetermined time interval, means connected to said connecting and disconnecting means for preventing connection of said coil and power source after the opening of the coil and power source connection prior to completion of said time interval, and means connected to said connecting and disconnecting means and responsive to relative axial movement between said coil and workpiece to render said connection preventing means inoperative.

2. An apparatus for the electromagnetic inductive heating of a workpiece, an inducing coil, a source of power therefor, timer means for connecting and disconnecting said coil and its source of power during a heating cycle, a relay energized in advance of actuation of said timer means for conditioning actuation thereof, means for deenergizing said relay in response to premature interruption of said timer cycle, and means for permitting reenergization of said relay only in response to relative axial movement between said coil and a workpiece out of and into heating position.

3. An apparatus for heating a workpiece by electromagnetic inductive heating comprising an inducing coil, a source of power therefor, timer means for connecting said coil and power source and for disconnecting the same automatically in response to completion of a timer cycle, means for disconnecting said coil and source of power in response to a premature interruption of said timer cycle, said last-mentioned means including a switch open only in response to said workpiece being in heating position with respect to said coil whereby said connecting means may be energized only after at least relative movement between the coil and workpiece for closing said switch.

4. An induction heating apparatus having an inducing coil, a source of power for the coil, means for connecting said coil and power source, means for disconnecting said coil from its source of power in response to the power being applied for a predetermined time, power means for said connecting and disconnecting means, safety means responsive to an interruption in application of said power means to said connecting and disconnecting means for conditioning said connecting means against being actuated and for permitting actuation of said disconnecting means in event the work is being heated, means for resetting said safety means only after removal of said power means interruption and only after relative longitudinal movement between the coil and work from and to heating position.

5. An apparatus for electromognetic inductive heating of a workpiece comprising an inducing coil, a source of power therefor, means connecting said coil and source of power, means for disconnecting said coil and source of power after a substantial time interval of power connection to said coil with said workpiece in heating position in said coil, means for actuating said connecting means again only after relative longitudinal movement between said workpiece and coil removing them from and then bringing them into heating cooperation.

6. An induction heating apparatus comprising an inducing coil, a source of power therefor, a timer for connecting and disconnecting said coil with its source of power, means for initiating actuation of said timer, means responsive to relative movement between the coil and work bringing them into heating relation to one another for energizing said timer initiating means, means responsive to timer movement for retaining said coil disconnected from its source of power after a heating period and until after relative movement between said coil and work out of and to heating position.

7. An electromagnetic inductive heating apparatus having a plurality of inducing coils, a source of power therefor, a timer controlling the connection and disconnection between each of said coils and source of power, a sequence controller whereby said coils and their timers may be actuated in sequence, means responsive to each timer for disconnecting said sequence controller and timer, and means responsive to work removal from and replacement in heating position in any one of said coils for connecting the sequence controller and timer of said coils.

8. In an apparatus for heating a workpiece by electromagnetic induction, a heating coil, chronometric means for determining a heating cycle in said coil, and control means for preventing repetition of said heating cycle on the same workpiece without partial removal thereof, said control means including a relay in actuating relationship to said chronometric means, and an actuating mechanism for said relay re-operable only by partial removal and reinsertion of the workpiece within the coil.

HAROLD A. STRICKLAND, Jr.